United States Patent
Yeh (10) Patent No.: US 11,409,596 B1
(45) Date of Patent: Aug. 9, 2022

(54) ENCODING CONTROL METHOD, MEMORY STORAGE DEVICE AND MEMORY CONTROL CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli ( * ) Notice: Subject to any disclaimer, the term of this patent is extended or adjusted under 35 U.S.C. 154(b) by 0 days.

(21) Appl. No.: 17/184,611

(22) Filed: Feb. 25, 2021

(30) Foreign Application Priority Data

Feb. 4, 2021 (TW) .................................. 110104118

(51) Int. Cl.
*G06F 11/10* (2006.01)
*G06F 3/06* (2006.01)
*G06F 13/16* (2006.01)

(52) U.S. Cl.
CPC ........ *G06F 11/1004* (2013.01); *G06F 3/0619* (2013.01); *G06F 3/0656* (2013.01); *G06F 3/0661* (2013.01); *G06F 3/0679* (2013.01); *G06F 13/1668* (2013.01)

(58) Field of Classification Search
CPC ............. G06F 11/1076; G06F 11/1068; G06F 11/1004; G06F 3/0661; G06F 3/0619; G06F 3/0683; G06F 3/0688; G06F 3/0679; G06F 3/0605; G06F 3/0656

See application file for complete search history.

(56) References Cited

U.S. PATENT DOCUMENTS

| | | | |
|---|---|---|---|
| 2018/0210669 A1* | 7/2018 | Lee ........................ | G06F 3/0613 |
| 2018/0210789 A1* | 7/2018 | Chae ................. | H03M 13/2927 |
| 2020/0050374 A1* | 2/2020 | Yoon ..................... | G06F 3/0605 |

* cited by examiner

*Primary Examiner* — Shelly A Chase
(74) *Attorney, Agent, or Firm* — JCIPRNET (57) ABSTRACT

An encoding control method, a memory storage device and a memory control circuit unit are provided. The method includes: reading a plurality of first data units by a plurality of first host to device (H2D) access operations; generating at least one first parity unit according to the first data units; transmitting the first parity unit to the host system by at least one first device to host (D2H) access operation; reading a plurality of second data units by a plurality of second H2D access operations; generating at least one second parity unit according to the first parity unit and the second data units without reading the first parity unit from the host system; transmitting the second parity unit to the host system by at least one second D2H access operation; and storing the first data units and the second data units to a first physical unit.

27 Claims, 8 Drawing Sheets

ENCODING CONTROL METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 110104118, filed on Feb. 4, 2021. The entirety of the above-mentioned patent application is hereby incorporated by reference herein and made a part of this specification.

BACKGROUND

Technical Field

The invention relates to a memory control technique, and more particularly, to an encoding control method, a memory storage device and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, compact size and no mechanical structure make a rewritable non-volatile memory module (e.g., flash memory) ideal to be built in the portable multi-media devices described above.

Some memory storage devices are compatible with host memory buffering. Under a framework compatible with host memory buffering, a memory storage device may adopt the memory of a host system as a buffer of the memory storage device, and may voluntarily access data in the memory of the host system. In general, by adopting host memory buffering, the buffering efficiency of the memory storage device may be facilitated, and/or the cost for setting up the memory storage device may be reduced. However, when performing data encoding based on host memory buffering, transition data used in the encoding process needs to be frequently read from the host memory buffer. As a result, the bandwidth for transmitting data to be encoded from the host system is reduced.

SUMMARY

Embodiments of the invention provide an encoding control method, a memory storage device, and a memory control circuit unit capable of facilitating data transmission and/or encoding efficiency under a framework of host memory buffering.

An exemplary embodiment of the invention provides an encoding control method for a memory storage device. The memory storage device includes an encoding circuit and a rewritable non-volatile module. The rewritable non-volatile memory module includes a plurality of physical units. The encoding control method includes: reading a plurality of first data units from a host system by a plurality of first host to device (H2D) access operations; executing a first encoding operation by the encoding circuit to generate at least one first parity unit according to the first data units; transmitting the at least one first parity unit to the host system by at least one first device to host (D2H0 access operation; reading a plurality of second data units by a plurality of second H2D access operations; executing a second encoding operation by the encoding circuit to generate at least one second parity unit according to at least one of the at least one first parity unit and the second data units without reading any of the at least one first parity unit from the host system; transmitting the second parity unit to the host system by at least one second D2H access operation; and storing the first data units and the second data units to a first physical unit of the physical units.

Another exemplary embodiment of the invention provides a memory storage device. The memory storage device includes a connection interface unit, a rewritable non-volatile memory module, and a memory control circuit unit. The connection interface unit is configured to be coupled to a host system. The rewritable non-volatile memory module includes a plurality of physical units. The memory control circuit unit is coupled to the connection interface unit and the rewritable non-volatile memory module. The memory control circuit unit is configured to read a plurality of first data units from the host system by a plurality of first host to device (H2D) access operations. The memory control circuit unit is further configured to execute a first encoding operation to generate at least one first parity unit according to the first data units. The memory control circuit unit is further configured to transmit the at least one first parity unit to the host system by at least one first device to host (D2H) access operation. The memory control circuit unit is further configured to read a plurality of second data units from the host system by a plurality of second host to device (H2D) access operations. The memory control circuit unit is further configured to execute a second encoding operation to generate at least one second parity unit according to at least one of the at least one first parity unit and the second data units without reading any of the at least one first parity unit from the host system. The memory control circuit unit is further configured to transmit the at least one second parity unit to the host system by at least one second device to host (D2H) access operation. The memory control circuit unit is further configured to store the first data units and the second data units to a first physical unit of the physical units.

Another exemplary embodiment of the invention provides a memory control circuit unit configured to control a memory storage device. The memory storage device includes a rewritable non-volatile module. The rewritable non-volatile memory module includes a plurality of physical units. The memory management circuit includes a host interface, a memory interface, an encoding circuit, and a memory management circuit. The host interface is configured to be coupled to a host system. The memory interface is configured to be coupled to the rewritable non-volatile memory module. The memory management circuit is coupled to the host interface, the memory interface, and the encoding circuit. The memory management circuit is configured to read a plurality of first data units from the host system by a plurality of first host to device (H2D) access operations. The encoding circuit is configured to execute a first encoding operation to generate at least one first parity unit according to the first data units. The memory memory management circuit is further configured to transmit the at least one first parity unit to the host system by at least one first device to host (D2H) access operation. The memory management circuit is further configured to read a plurality of second data units from the host system by a plurality of second host to device (H2D) access operations. The encoding circuit is further configured to execute a second encoding operation to generate at least one second parity unit according to at least one of the at least one first parity unit and the second data units without reading any of the at least one first parity unit from the host system. The memory memory management circuit is further configured to transmit the at least one second parity unit to the host system by at least one second device to host (D2H) access operation. The memory management circuit is further configured to store the first data units and the second data units to a first physical unit of the physical units.

Based on the above, after the first data units are read from the host system by the H2D access operations, the first encoding operation may be executed to generate the first parity unit according to the first data units, and the first parity unit may be transmitted to the host system by the D2H access operation. Then, the second data units may be read from the host system by the H2D access operations. Without reading any of the first parity unit from the host system, the second encoding operation may be executed to generate the second parity unit according to the first parity unit and the second data units. Then, the second parity unit may be transmitted to the host system through the D2H access operation. In addition, the first data units and the second data units may be stored in the first physical unit. By reducing the bandwidth of the H2D channel occupied during the encoding and transmission of the data units, the data transmission and/or encoding efficiency under the framework of host memory buffering can be facilitated.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

DESCRIPTION OF THE EMBODIMENTS

Reference will now be made in detail to the exemplary embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A,B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more," and "at least one" can be used interchangeably herein.

In general, a memory storage device (a.k.a. a memory storage system) includes a rewritable non-volatile memory module and a controller (a.k.a. a control circuit). The memory storage device usually operates together with a host system so that the host system can write data into the memory storage device or read data from the memory storage device.

Figure 1:
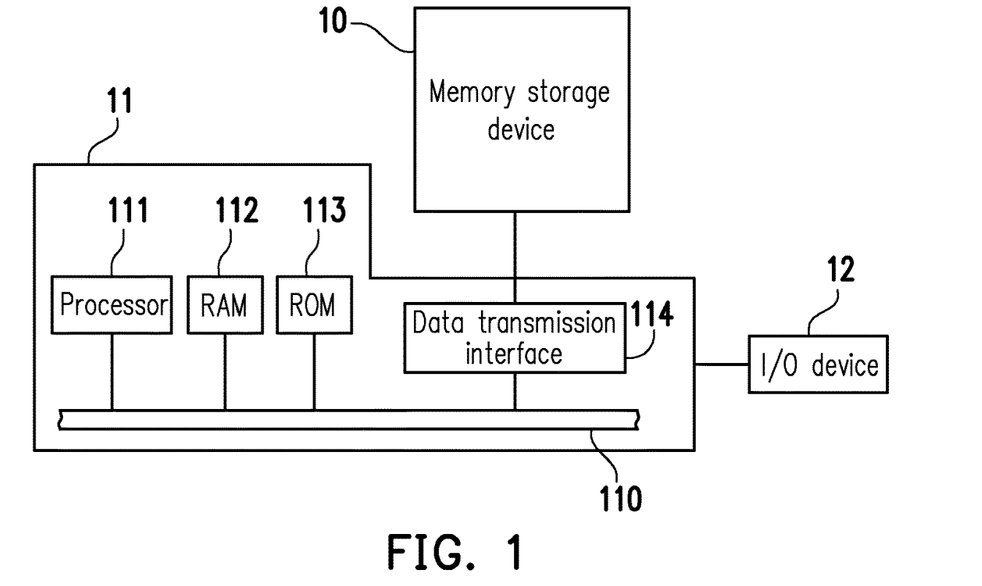
FIG. 1 is a schematic diagram illustrating a host system, a memory storage device and an I/O (input/output) device according to an exemplary embodiment of the invention.
Figure 2:
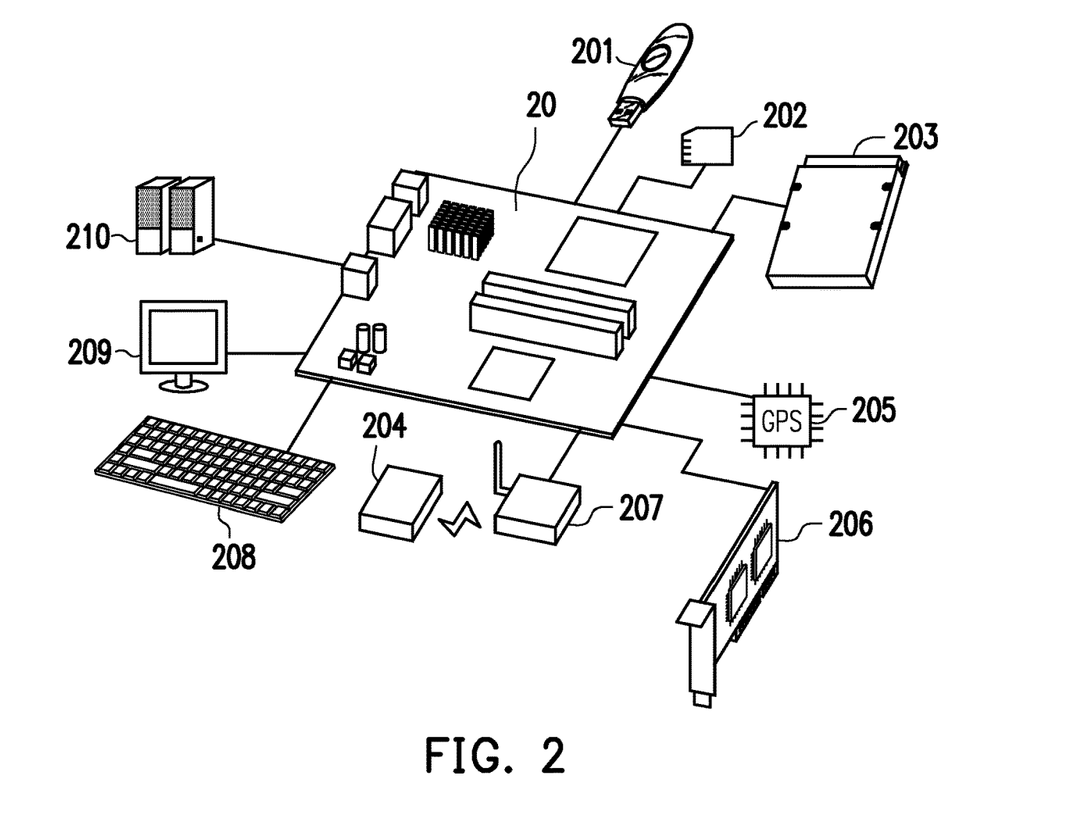
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In this exemplary embodiment, the processor 111, the RAM 112, the ROM 113 and the data transmission interface 114 may be disposed on a main board 20 of the host system 11. The number of the data transmission interfaces 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device and a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
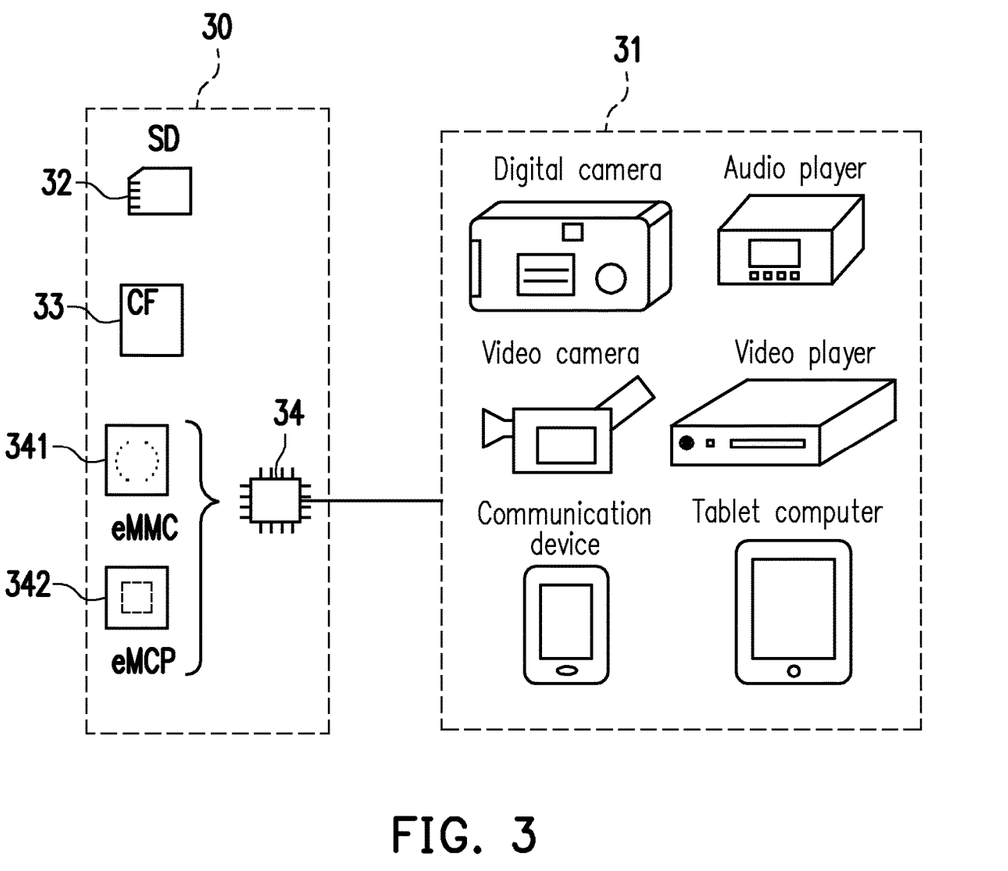
FIG. 3 is a schematic diagram illustrating a host system and a memory storage device according to another exemplary embodiment of the invention.

In an exemplary embodiment, the aforementioned host system may be any system capable of substantially cooperating with the memory storage device for storing data. The host system is illustrated as a computer system in the foregoing exemplary embodiment. Nonetheless, FIG. 3 is a schematic diagram illustrating a host system and a memory storage device according to another exemplary embodiment of the invention. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
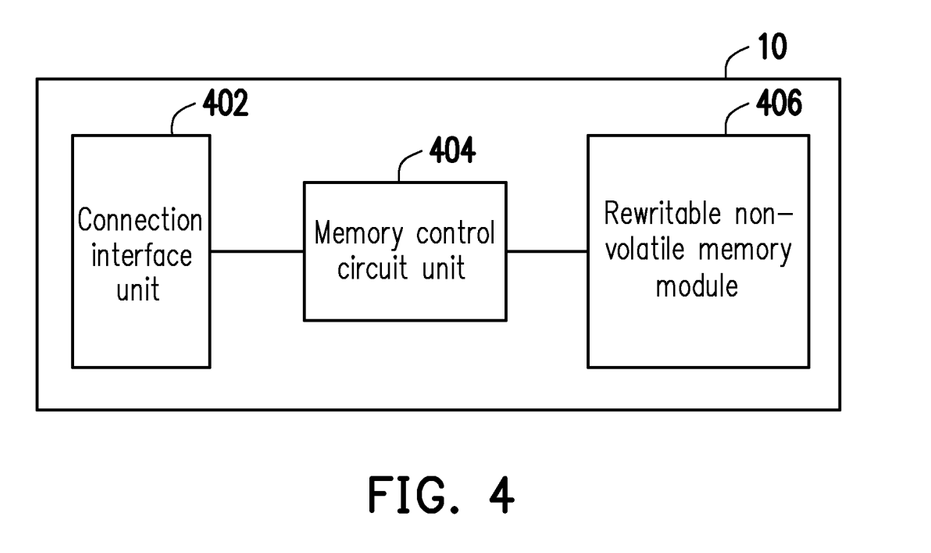
FIG. 4 is a schematic block diagram illustrating a memory storage device according to an exemplary embodiment of the invention.

FIG. 4 is a schematic block diagram illustrating a memory storage device according to an exemplary embodiment of the invention. Referring to FIG. 4, the memory storage device 10 includes a connection interface unit 402, a memory control circuit unit 404 and a rewritable non-volatile memory module 406.

The connection interface unit 402 is configured to couple the memory storage device 10 to the host system 11. The memory storage device 10 can communicate with the host system 11 through the connection interface unit 402. In this exemplary embodiment, the connection interface unit 402 is compatible with a peripheral component interconnect express (PCIe) standard and/or a non-volatile memory express (NVMe) standard. However, it should be understood that the invention is not limited thereto. The connection interface unit 402 may also be compatible with other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading and erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quad Level Cell) NAND flash memory module (i.e., a flash memory module capable of storing four bits in one memory cell), other flash memory modules or other memory modules having the same features.

In the rewritable non-volatile memory module 406, one or more bits are stored by changing a voltage (hereinafter, also referred to as a threshold voltage) of each of the memory cells. More specifically, in each of the memory cells, a charge trapping layer is provided between a control gate and a channel. The amount of electrons in the charge trapping layer may be changed by applying a write voltage to the control gate, thereby changing the threshold voltage of the memory cell. This operation of changing the threshold voltage of the memory cell is also referred to as "writing data into the memory cell" or "programming the memory cell". With the change in the threshold voltage, each of the memory cells in the rewritable non-volatile memory module 406 has a plurality of storage states. The storage state to which the memory cell belongs may be determined by applying a read voltage to the memory cell, so as to obtain the one or more bits stored in the memory cell.

In this exemplary embodiment, the memory cells of the rewritable non-volatile memory module 406 may constitute a plurality of physical programming units, and the physical programming units can constitute a plurality of physical erasing units. Specifically, the memory cells on the same word line may constitute one or more of the physical programming units. If each of the memory cells can store two or more bits, the physical programming units on the same word line may be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit may be a physical page or a physical sector. If the physical programming unit is the physical page, these physical programming units may include a data bit area and a redundancy bit area. The data bit area contains multiple physical sectors configured to store user data, and the redundancy bit area is configured to store system data (e.g., management data such as an error correcting code, etc.). In this exemplary embodiment, the data bit area contains 32 physical sectors, and a size of each physical sector is 512 bytes (B). However, in other exemplary embodiments, the data bit area may also contain 8 or 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
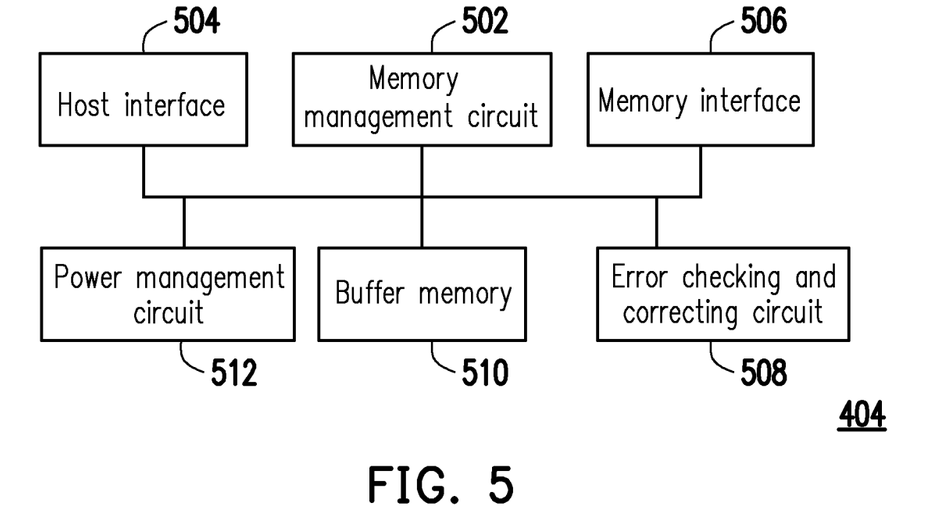
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention. Referring to FIG. 5, the memory control circuit unit 404 includes a memory management circuit 502, a host interface 504, a memory interface 506, and an error checking and correcting circuit 508.

The memory management circuit 502 is configured to control overall operations of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a read-only memory (not illustrated), and the control commands are burnt into the read-only memory. When the memory storage device 10 operates, the control commands are executed by the microprocessor unit to perform operations of writing, reading and erasing data.

In another exemplary embodiment, the control commands of the memory management circuit 502 may also be stored as program codes in a specific area (e.g., the system area in the memory module exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations of writing, reading and erasing data.

Further, in another exemplary embodiment, the control commands of the memory management circuit 502 may also be implemented in form of hardware. For example, the memory management circuit 502 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage the memory cells or a memory cell group of the rewritable non-volatile memory module 406. The memory writing circuit is configured to issue a write command sequence to the rewritable non-volatile memory module 406 to write data into the rewritable non-volatile memory module 406. The memory reading circuit is configured to issue a read command sequence to the rewritable non-volatile memory module 406 to read data from the rewritable non-volatile memory module 406. The memory erasing circuit is configured to issue an erase command sequence to the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequences of other types to the rewritable non-volatile memory module 406 for instructing to perform the corresponding operations.

The host interface 504 is coupled to the memory management circuit 502. The memory management circuit 502 can communicate with the host system 11 through the host interface 504. In this exemplary embodiment, the host interface 504 is compatible with the PCIe standard and/or the NVMe standard. Nevertheless, it should be understood that the invention is not limited in this regard. The host interface 504 may also be compatible with other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends the corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 via the memory interface 506, for example. The command sequences may include one or more signals, or data on the bus. The signals or the data may include command codes and program codes. For example, information such as identification codes and memory addresses is included in the read command sequence.

The error checking and correcting circuit (a.k.a. an encoding circuit or a decoding circuit) 508 is coupled to the memory management circuit 502 and configured to execute an error checking and correcting operation to ensure the correctness of data. Specifically, when the memory management circuit 502 receives the write command from the host system 11, the error checking and correcting circuit 508 generates an error correcting code (ECC) and/or an error detecting code (EDC) for data corresponding to the write command, and the memory management circuit 502 writes data corresponding to the write command and the corresponding ECC and/or EDC to the rewritable non-volatile memory module 406. Then, when the memory management circuit 502 reads the data from the rewritable non-volatile memory module 406, the corresponding ECC and/or EDC are also read, and the error checking and correcting circuit 508 executes the error checking and correcting operation on the read data based on the ECC and/or the EDC.

In an exemplary embodiment, the memory control circuit unit 404 further includes a power management circuit 512. The buffer memory 510 is coupled to the memory management circuit 502 and configured to temporarily store the data and commands from the host system 11 or the data from the rewritable non-volatile memory module 406. The power management unit 512 is coupled to the memory management circuit 502 and configured to control a power of the memory storage device 10.

In an exemplary embodiment, the rewritable non-volatile memory module 406 of FIG. 4 is also known as a flash memory module, and the memory control circuit unit 404 is also known as a flash memory controller for controlling the flash memory module. In an exemplary embodiment, the memory management circuit 502 of FIG. 5 is also known as a flash memory management circuit.

Figure 6:
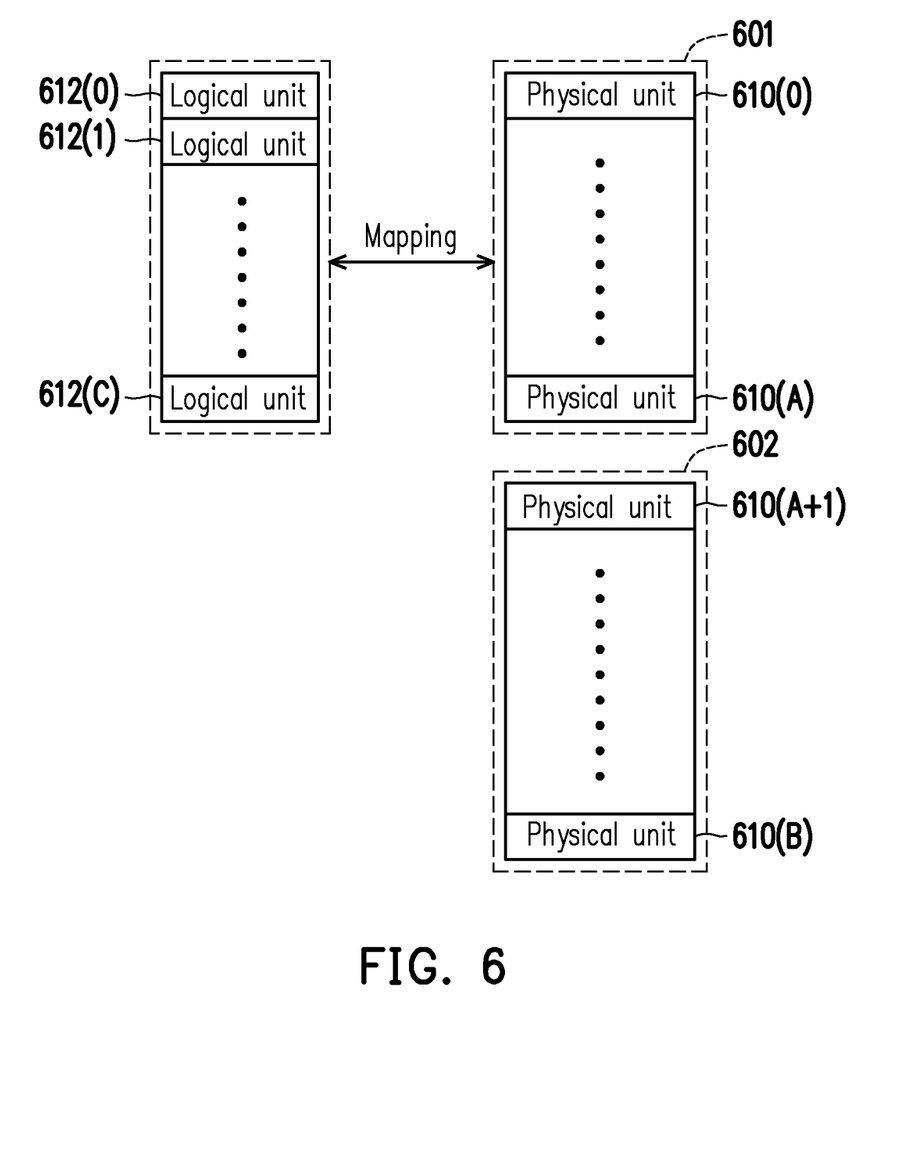
FIG. 6 is a schematic diagram illustrating management of a rewritable non-volatile memory module according to an exemplary embodiment of the invention.

FIG. 6 is a schematic diagram illustrating management of a rewritable non-volatile memory module according to an exemplary embodiment of the invention. Referring to FIG. 6, the memory management circuit 502 can logically group physical units 610(0) to 610(B) of the rewritable non-volatile memory module 406 into a storage area 601 and a replacement area 602. The physical units 610(0) to 610(A) in the storage area 601 are configured to store data, and the physical units 610(A+1) to 610(B) in the replacement area 602 are configured to replace damaged physical units in the storage area 601. For example, if data read from one specific physical unit includes too many errors and these errors cannot be corrected, the specific physical unit is regarded as a damaged physical unit. In addition, if there are no available physical erasing units in the replacement area 602, the memory management circuit 502 may declare the entire memory storage device 10 as in a write protect state so that data can no longer be written thereto.

In this exemplary embodiment, each physical unit refers to one or more physical erasing units. The memory management circuit 502 assigns logical units 612(0) to 612(C) for mapping to the physical units 610(0) to 610(A) in the storage area 601. In this exemplary embodiment, each logical unit refers to one logical address. However, in another exemplary embodiment, each logical unit may also refer to one logical programming unit, one logical erasing unit or a composition of a plurality of continuous or discontinuous logical addresses. In addition, each of the logical units 612(0) to 612(C) may also be mapped to one or more physical units.

The memory management circuit 502 can record a mapping relation (a.k.a. a logical-physical address mapping relation) between the logical units and the physical units into at least one logical-physical address mapping table. When the host system 11 intends to read the data from the memory storage device 10 or write the data into the memory storage device 10, the memory management circuit 502 can execute a data accessing operation on the memory storage device 10 according to the logical-physical address mapping table.

Figure 7:
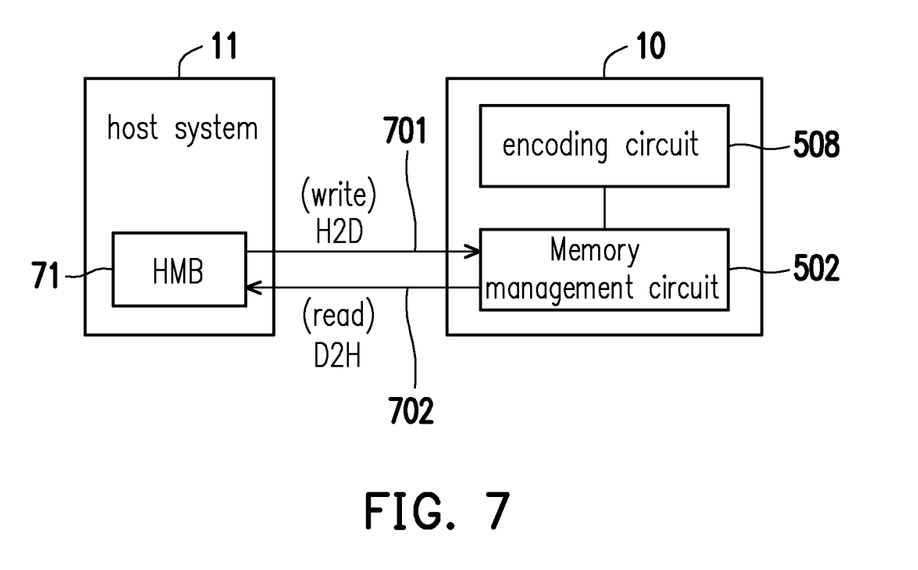
FIG. 7 is a schematic diagram illustrating data accessing between a host system and a memory storage device according to an exemplary embodiment of the invention.

FIG. 7 is a schematic diagram illustrating data accessing between a host system and a memory storage device according to an exemplary embodiment of the invention. Referring to FIG. 7, the host system 11 and the memory storage device 10 are both compatible with host memory buffering. Under the framework of host memory buffering, the host system 11 may be provided with a host memory buffer (HMB) 71. For example, the HMB 71 may include at least one random access memory and be configured to buffer (i.e., temporarily store) data. The memory storage device 10 may voluntarily read data buffered in the HMB 71 via a channel 701 or voluntarily buffer data to the HMB 71 via a channel 702.

In an exemplary embodiment, the memory management circuit 502 may receive a request from the host system 11. The request is adapted to inquire whether the memory storage device 10 is compatible with host memory buffering. The memory management circuit 502 may provide a response to the host system 11 according to the request. The response may inform the host system 11 on whether the memory storage device 10 is compatible with host memory buffering. If the memory storage device 10 is compatible with host memory buffering, the host system 11 may enable the HMB 71 to be accessed by the memory storage device 10 according to the response. Alternatively, if the memory storage device 10 is not compatible with host memory buffering, the host system 11 may not enable the HMB 71. In an exemplary embodiment, if the memory storage device 10 is compatible with host memory buffering, the response may also inform the host system 11 about parameters related to host memory buffering, such as the memory space required for executing host memory buffering. The host system 11 may configure setting information related to the HMB 71 according to response.

In an exemplary embodiment, an operation in which the memory storage device 10 reads data in the HMB 71 may be considered as that the memory storage device 10 voluntarily reads data buffered in the HMB 71 by at least one host to device (H2D) access operation. In an exemplary embodiment, an operation in which the memory storage device 10 buffers data into the HMB 71 may be considered as that the memory storage device 10 voluntarily buffers data into the HMB 71 by at least one device to host (D2H) access operation.

In an exemplary embodiment, the H2D access operation is similar to a data writing operation of the host system 11. In the H2D access operation, data may be transmitted from the host system 11 to the memory storage device 10 via the channel 701 for data processing and/or storage. In an exemplary embodiment, the D2H access operation is similar to a data reading operation of the host system 11. In the D2H access operation, data may be transmitted from the memory storage device 10 to the host system 11 via the channel 702.

In an exemplary embodiment, the HMB 71 may be considered as equivalent or similar to a buffer memory of the memory storage device 10. During the operation of the memory storage device 10, the memory storage device 10 may read data to be stored from the HMB 71 via the channel 701 and execute processing, such as encoding, on the data. In addition, data (also referred to as transition data) generated during the processing such as encoding on the data may be buffered to the HMB 71 for subsequent use via the channel 702.

In an exemplary embodiment, the transition data includes temporary data or non-necessary data generated during a process, such as data encoding/decoding. For example, the transition data may be buffered to the HMB 71, but may not be stored to the rewritable non-volatile memory module 406. In addition, the transition data may be deleted when no longer needs to be used. In an exemplary embodiment, the transition data may also include parity data generated by encoding data to be stored in the HMB 71.

In an exemplary embodiment, the HMB 71 may entirely replace the buffer memory 510 in FIG. 5. That is, in an exemplary embodiment, the memory storage device 10 or the memory control circuit unit 404 may not be provided with or not use the buffer memory 510.

In an exemplary embodiment, the HMB 71 may co-exist with the buffer memory 510 shown in FIG. 5. For example, the HMB 71 may serve as an extra buffer space of the memory storage device 10. The HMB 71 and the buffer memory 510 may be used together according to a predetermined rule. For example, when the host system 11 and the memory storage device 10 are both compatible with host memory buffering, the memory storage device 10 may preferentially use the HMB 71. However, when the coupled host system 11 does not provide the HMB 71 to be accessed by the memory storage device 10, the memory storage device 10 is only allowed to use the buffer memory 510. The invention does not limit on the rule of use when the HMB 71 co-exists with the buffer memory 510.

In an exemplary embodiment, the encoding circuit 508 may encode multiple data units and generate one or more parity units. The data units may be data to be stored from the host system 11. One data unit may include multiple bits. For example, the data length of one data unit may be equal to the data length of one or more logical units. In addition, the data in one data unit may be stored to one or more physical programming units.

In an exemplary embodiment, the memory management circuit 502 may read multiple data units (also referred to as first data units) from the host system 11 by multiple H2D access operations (also referred to first H2D access operations). The encoding circuit 508 may execute an encoding operation (also referred to as first encoding operation) to generate at least one parity unit (also referred to as first parity unit) according to the first data units. Then, the memory management circuit 502 may transmit the first parity unit to the host system 11 by at least one D2H access operation (also referred to as first D2H access operation).

Meanwhile, the memory management circuit 502 may read multiple data units (also referred to as second data units) from the host system 11 by multiple H2D access operations (also referred to second H2D access operations). The encoding circuit 508 may, without reading any of the first parity unit from the host system 11, execute another encoding operation (also referred to as second encoding operation) to generate at least one parity unit (also referred to as second parity unit) according to at least one of the first parity unit and the second data units. Then, the memory management circuit 502 may transmit the second parity unit to the host system 11 by at least one D2H access operation (also referred to as second D2H access operation). The first H2D access operation, the first D2H access operation, the second H2D access operation, and the second D2H access operation serve to access the HMB 71 of the host system 11. In addition, the memory management circuit 502 may store the first data units and the second data units to a physical unit (also referred to as first physical unit) in the rewritable non-volatile memory module 406. For example, the first physical unit may be the physical unit 610(0) in FIG. 6.

It should be noted that, the encoding operations on the first data units and the second data units do not include or involve reading transition data (e.g., parity data) from the host system 11 by a H2D access operation. Therefore, the data writing bandwidth of the host system 11 (i.e., the transmission bandwidth of the channel 701) is not occupied by the transmission of any parity unit used as transition data. Meanwhile, the host system 11 does not detect any decrease in data writing speed and/or transmission speed due to the transmission of any transition data occupying the transmission bandwidth for data units.

In an exemplary embodiment, the memory management circuit 502 may determine the first physical unit as an open unit (also referred to as open block). The number of the first physical unit may be one or more. In a state in which the first physical unit remains as an open unit, the memory management circuit 502 may store the first data units and the second data units from the host system 11 to the first physical unit. In addition, the memory management circuit 502 may store the entirety or at least a portion of the data to be stored from the host system 11 to the first physical unit currently serving as the open unit, until the first physical unit becomes full. Once the first physical unit is full, the memory management circuit 502 may choose another physical unit (e.g., the physical unit 610(1) in FIG. 6) as a new open unit to store other data from the host system 11.

In the encoding operation according to an exemplary embodiment, the encoding circuit 508 may execute cross-page encoding on at least two data units of multiple data units from the host system 11. In an exemplary embodiment, a parity unit generated through cross-page encoding is also referred to as a first type parity unit. In addition, the first type parity unit is adapted to protect data belonging to multiple physical pages in the data units. For example, assuming that one data unit corresponds to one physical page, the encoding circuit 508 may execute cross-page encoding on multiple data units to generate a parity unit capable of protecting data of multiple physical pages at the same time. When data read from a physical page contains an error, the encoding circuit 508 may attempt to correct the error in the physical page according to the parity unit and data of other physical pages. In an exemplary embodiment, the encoding circuit 508 may execute the cross-page encoding based on an encoding/decoding algorithm such as logic exclusive-OR (XOR) or Reed-Solomon codes (RS codes).

In the encoding operation according to an exemplary embodiment, the encoding circuit 508 may execute single-page encoding on a single data unit from the host system 11. In an exemplary embodiment, a parity unit generated through single-page encoding is also referred to as a second type parity unit. In addition, the second type parity unit is adapted to protect data belonging to a single physical page in the data unit. For example, assuming that one data unit corresponds to one physical page, the encoding circuit 508 may execute single-page encoding on a single data unit to generate a parity unit capable of protecting data of a single physical page. When data read from the physical page contains an error, the encoding circuit 508 may attempt to correct the error in the physical page according to the parity unit. In an exemplary embodiment, the encoding circuit 508 may execute the single-page encoding based on an encoding/decoding algorithm such as low-density parity-check (LDPC) codes, BCH codes, convolutional codes, turbo codes.

Figure 8:
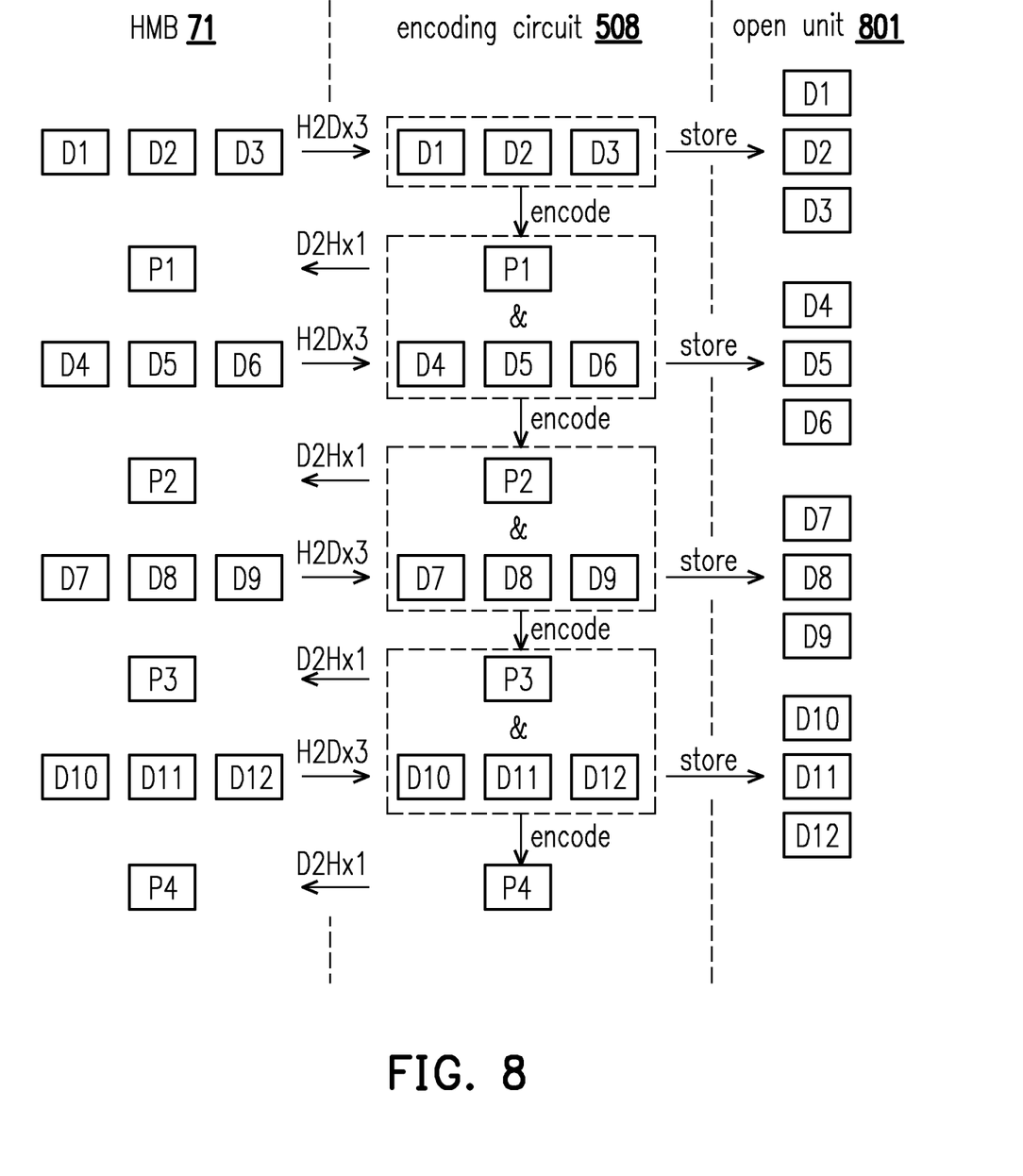
FIG. 8 is a schematic diagram illustrating data accessing and encoding according to an exemplary embodiment of the invention.

FIG. 8 is a schematic diagram illustrating data accessing and encoding according to an exemplary embodiment of the invention. Referring to FIG. 8, the memory management circuit 502 may sequentially read data units D1 to D12 from the HMB 71. The data units D1 to D12 are data to be stored which are buffered in the HMB 71. The encoding circuit 508 may execute at least one encoding operation on the data units D1 to D12 to generate parity units P1 to P4 according to the data units D1 to D12.

Specifically, the memory management circuit 502 may sequentially read the data units D1 to D3 from the HMB 71 by three H2D access operations. The encoding circuit 508 may encode the data units D1 to D3 to generate the parity unit P1. Then, the memory management circuit 502 may transmit the parity unit P1 to the HMB 71 by one D2H access operation. In addition, the data units D1 to D3 may be stored to an open unit 801.

Afterwards, the memory management circuit 502 may sequentially read the data units D4 to D6 from the HMB 71 by three H2D access operations. The encoding circuit 508 may encode the data units D4 to D6 and the previously generated parity unit P1 to generate the parity unit P2. It should be noted that the parity unit P1 used by the encoding circuit 508 does not need to be read from the HMB 71. In other words, the parity unit P1 does not need to be read from the HMB 71 through an H2D access operation. Then, the memory management circuit 502 may transmit the parity unit P2 to the HMB 71 by one D2H access operation. In addition, the data units D4 to D6 may be stored to the open unit 801.

Afterwards, the memory management circuit 502 may sequentially read the data units D7 to D9 from the HMB 71 by three H2D access operations. The encoding circuit 508 may encode the data units D7 to D9 and the previously generated parity unit P2 to generate the parity unit P3. It should be noted that the parity unit P2 used by the encoding circuit 508 does not need to be read from the HMB 71, either. In other words, the parity unit P2 does not need to be read from the HMB 71 through an H2D access operation, either. Then, the memory management circuit 502 may transmit the parity unit P3 to the HMB 71 by one D2H access operation. In addition, the data units D7 to D9 may be stored to the open unit 801.

Afterwards, the memory management circuit 502 may sequentially read the data units D10 to D12 from the HMB 71 by three H2D access operations. The encoding circuit 508 may encode the data units D10 to D12 and the previously generated parity unit P3 to generate the parity unit P4. It should be noted that the parity unit P3 used by the encoding circuit 508 does not need to be read from the HMB 71, either. In other words, the parity unit P3 does not need to be read from the HMB 71 through an H2D access operation, either. Then, the memory management circuit 502 may transmit the parity unit P4 to the HMB 71 by one D2H access operation. In addition, the data units D10 to D12 may be stored to the open unit 801.

Conventionally, during the transmission and encoding processes of the data units D1 to D12, parity data (or other transition data) generated during the encoding process may be frequently transmitted between the host system 11 and the memory storage device 10 through H2D access operations and/or D2H access operations. However, every time when a H2D access operation is executed to transmit parity data from the HMB 71 to the memory storage device 10, the host system 11 may detect a decrease in data writing speed and/or transmission speed because the transmission bandwidth of the channel 701 is occupied.

However, in the exemplary embodiment of FIG. 8, during the period in which the encoding operation is executed, the memory management circuit 502 may not read any parity unit from the HMB 71 by an additional H2D access operation. In other words, according to the exemplary embodiment of FIG. 8, during the process of transmitting the data units D1 to D12, the transmission bandwidth for the data units D1 to D12 (i.e., the transmission bandwidth of the channel 701) is not occupied by the transmission of any parity unit serving as transition data. Accordingly, the host system 11 does not detect any decrease in data writing speed and/or transmission speed due to the transmission of any transition data occupying the transmission bandwidth for the data units D1 to D12.

In an exemplary embodiment, if the physical unit (e.g., the physical unit 610(0) shown in FIG. 6) used as the open unit (e.g., the open unit 801) is full, the physical unit may be closed, and data may no longer be written to the physical unit. Meanwhile, another physical unit (e.g., the physical unit 610(1) in FIG. 6) may be chosen as a new open unit to store other data from the host system 11.

According to an exemplary embodiment, in a state in which the first physical unit serves as the open unit (i.e., before the first physical unit becomes full), at least some of the parity units P1 to P4 may not be stored to the first physical unit (or other storage location in the rewritable non-volatile memory module 406). Therefore, when at least some of the parity units P1 to P4 needs to be used to decode data, the memory management circuit 502 may read the required parity unit from the host system 11.

According to an exemplary embodiment, in the state in which the first physical unit serves as the opening unit (i.e., before the first physical unit becomes full), the memory management circuit 502 may read at least one parity unit (also referred to as third parity unit) from the host system 11 by at least one H2D access operation (also referred to as third H2D access operation). The third parity unit may be any one of the first parity unit or the second parity unit. Afterwards, the encoding circuit 508 may decode the data read from the first physical unit according to the third parity unit.

Taking FIG. 8 as an example, before the current open unit 801 becomes full, if a read command from the host system 11 instructs to read one of the data units D1 to D12, the memory management circuit 502 may read at least one of the parity units P1 to P4 from the HMB 71 by at least one H2D access operation. Then, the encoding circuit 508 may decode at least one of the data units D1 to D12 (e.g., correcting an error in the data) read from the open unit 801 according to the parity unit from the host system 11.

According to an exemplary embodiment, in the state in which the first physical unit does not serve as the opening unit (i.e., the first physical unit has become full), the memory management circuit 502 may read at least one parity unit (also referred to as fourth parity unit) from the host system 11 by at least one H2D access operation (also referred to as fourth H2D access operation). The fourth parity unit may be any one of the first parity unit or the second parity unit. The encoding circuit 508 may generate at least one parity unit (also referred to as fifth parity unit) according to the fourth parity unit. Then, the memory management circuit 502 may store the fifth parity unit to a physical unit (also referred to as second physical unit). Afterwards, the encoding circuit 508 may decode data read from the first physical unit according to the fifth parity unit read from the second physical unit.

Figure 9:
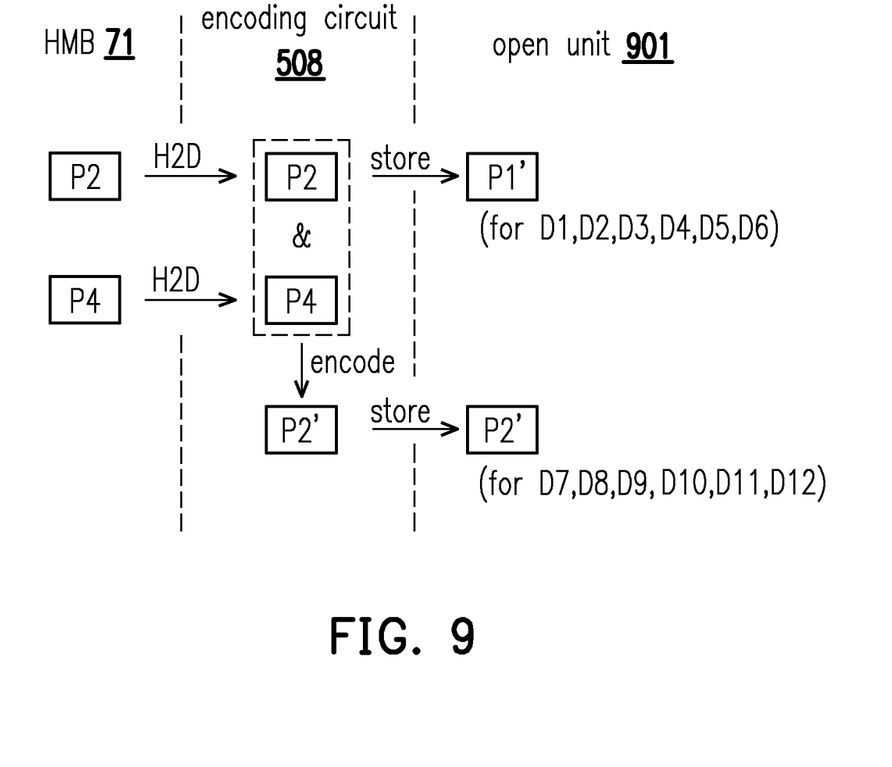
FIG. 9 is a schematic diagram illustrating data accessing and encoding according to an exemplary embodiment of the invention.

FIG. 9 is a schematic diagram illustrating generating and storing a parity unit according to an exemplary embodiment of the invention. Referring to FIG. 9, following the exemplary embodiment shown in FIG. 8, a new open unit 901 (i.e., the second physical unit) may be determined after the open unit 801 has become full. Then, at a time point, the memory management circuit 502 may read at least one of the parity units P1 to P4 from the HMB 71 via the channel 701 in an idle state or a low transmission amount state. Then, the encoding circuit 508 may generate a new parity unit P1' and/or P2' according to the parity unit read from the HMB 71. The memory management circuit 502 may store the parity unit P1' and/or P2' that are/is generated to the open unit 901 (or other storage location in the rewritable non-volatile memory module 406). Then, the parity unit P1' and/or P2' stored in the new open unit 901 (i.e., the second physical unit) may serve to decode the data units D1 to D12 stored in the old open unit 801 (i.e., the first physical unit).

Taking FIG. 9 as an example, according to an exemplary embodiment, the memory management circuit 502 may read the parity units P2 and P4 from the HMB 71 by two H2D access operations. The memory management circuit 502 may adopt the parity unit P2 as the parity unit P1' and store the parity P1' to the open unit 901. Meanwhile, the encoding circuit 508 may encode the parity units P2 and P4 to generate the parity unit P2'. The memory management circuit 502 may store the parity P2' to the open unit 901. Then, when at least one of the data units D1 to D12 is read from the rewritable non-volatile memory module 406, the parity unit P1' and/or P2' may be read and used to decode the data units D1 to D12 and correct a potential error in the data units D1 to D12. For example, the parity unit P1' may be specifically used to decode the data units D1 to D6, whereas the parity unit P2' may be specifically used to decode the data units D7 to D12.

According to an exemplary embodiment of FIG. 8, the parity unit P4 is generated by encoding the data units D1 to D12. However, according to an exemplary embodiment of FIG. 9, the parity units P1' and P2' are generated by performing a process (e.g., encoding) on the parity units P2 and P4 from the HMB 71. In other words, according to an exemplary embodiment of FIG. 9, after the encoding of the data units D1 to D12 is completed, the parity units P1' and P2' are generated without involving the encoding of any of the data units D1 to D12.

According to an exemplary embodiment of FIG. 8, the parity unit P4 may also be directly stored to the rewritable non-volatile memory module 406 for subsequent decoding of the data units D1 to D12. However, compared with the exemplary embodiment of FIG. 8, the parity units P1' and P2' generated in the exemplary embodiment of FIG. 9 have a greater error correction capability over the error correction capability of the single parity unit P4 for the data units D1 to D12. For example, during reading of the data units, the parity unit P4 may not be able to correct erroneous bits simultaneously present in the data units D2 and D5, whereas the parity units P1' and P2' are able to correct the erroneous bits simultaneously present in the data units D2 and D5.

Alternatively, according to an exemplary embodiment shown in FIG. 8, the parity unit P2 currently generated may be directly adopted as the parity unit P1' to be stored to the rewritable non-volatile memory module 406. Subsequently, in the exemplary embodiment shown FIG. 9, it only needs to generate the parity unit P2' and store the parity unit P2' to the rewritable non-volatile memory module 406.

It should be noted that the exemplary embodiments shown in FIGS. 8 and 9 are examples in which the data units D1 to D12 are adopted as data units to be stored. However, in other exemplary embodiments, more data units may be read and encoded. The invention is not particularly limited in this regard. In addition, the exemplary embodiment shown in FIG. 9 is an example in which one parity unit protects six data units. However, in other exemplary embodiments, a single parity unit may protect a greater or fewer number of data units. The invention is not particularly limited in this regard.

Also, in the exemplary embodiments, the HMB 71 located at the host system 11 is adopted as a storage space for buffering the transition data (e.g., the encoding units P1 to P4). However, in another exemplary embodiment, the HMB 71 may also be replaced by a specific storage space in the rewritable non-volatile memory module 406. Accordingly, the interaction between the memory storage device 10 and the host system 11 may also be replaced by the interaction between the memory control circuit unit 404 and the rewritable non-volatile memory module 406, and operational details in this regard will not be repeated in the following.

Figure 10:
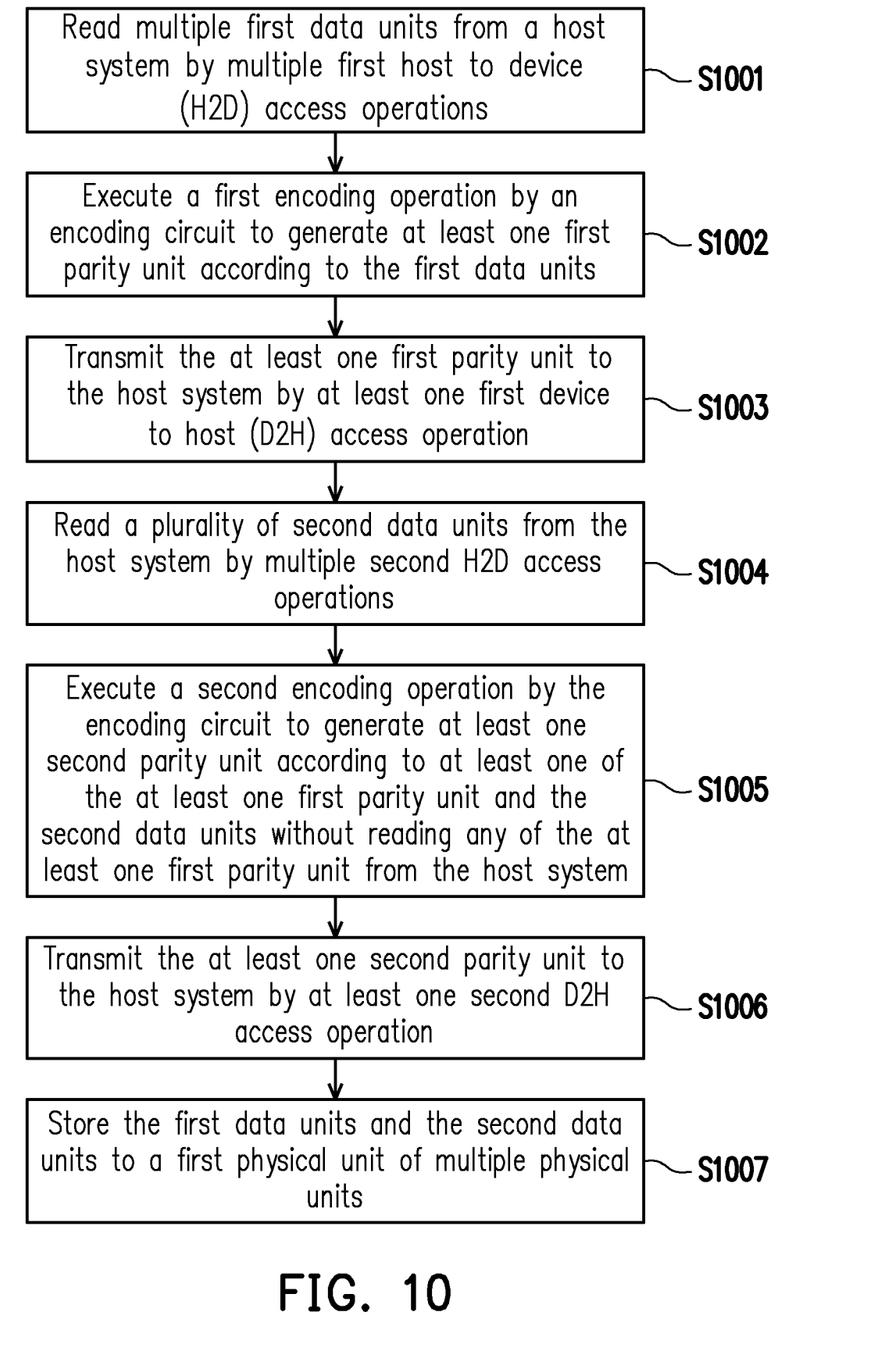
FIG. 10 is a flowchart illustrating an encoding control method according to an exemplary embodiment of the invention.

FIG. 10 is a flowchart illustrating an encoding control method according to an exemplary embodiment of the invention. Referring to FIG. 10, in Step S1001, multiple first data units are read from a host system by multiple host to device (H2D) access operations. In Step S1002, a first encoding operation is executed by an encoding circuit to generate at least one first parity unit according to the first data units. In Step S1003, the at least one first parity unit is transmitted to the host system by at least one first device to host (D2H) access operation. In Step S1004, multiple second data units are read from the host system by multiple second H2D access operations. In Step S1005, a second encoding operation is executed by the encoding circuit to generate at least one second parity unit according to at least one of the at least one parity unit and the second data units without reading any of the at least one first parity unit from the host system. In Step S1006, the at least one second parity unit is transmitted to the host system by at least one second D2H access operation. In Step S1007, the first data units and the second data units are stored to a first physical unit of multiple physical units.

Details of the respective steps shown in FIG. 10 have been described above and therefore will not be repeated in the following. It should be noted that the respective steps in FIG. 10 may be implemented as multiple program codes or circuits. The invention is not particularly limited in this regard. In addition, the method shown in FIG. 10 may be used with the exemplary embodiments or practiced alone. The invention is not particularly limited in this regard.

In view of the foregoing, according to the exemplary embodiments of the invention, the bandwidth of the H2D channel occupied by the transition data generated during the encoding operation may be reduced in the encoding and transmission of data units. Accordingly, the data transmission and/or encoding efficiency under the framework of host memory buffering can be facilitated.

The previously described exemplary embodiments of the present invention have the advantages aforementioned, wherein the advantages aforementioned not required in all versions of the present invention.

It will be apparent to those skilled in the art that various modifications and variations can be made to the structure of the present invention without departing from the scope or spirit of the present invention. In view of the foregoing, it is intended that the present invention cover modifications and variations of the present invention provided they fall within the scope of the following claims and their equivalents.

What is claimed is:

1. An encoding control method for a memory storage device, wherein the memory storage device comprises an encoding circuit and a rewritable non-volatile memory module, the rewritable non-volatile memory module comprises a plurality of physical units, and the encoding control method comprises:
   reading a plurality of first data units from a host system by a plurality of first host to device access operations;
   executing a first encoding operation by the encoding circuit to generate at least one first parity unit according to the first data units;
   transmitting the at least one first parity unit to the host system by at least one first device to host access operation;
   reading a plurality of second data units from the host system by a plurality of second host to device access operations;
   executing a second encoding operation by the encoding circuit to generate at least one second parity unit according to at least one of the at least one first parity unit and the second data units without reading any of the at least one first parity unit from the host system;
   transmitting the at least one second parity unit to the host system by at least one second device to host access operation; and
   storing the first data units and the second data units to a first physical unit of the physical units.

2. The encoding control method as claimed in claim 1, wherein the first host to device access operations, the at least one first device to host access operation, the second host to device access operations, and the at least one second device to host access operation serve to access a host memory buffer of the host system.

3. The encoding control method as claimed in claim 1, further comprising:

determining the first physical unit as an open unit; and
in a state in which the first physical unit serves as the open unit, storing the first data units and the second data units from the host system to the first physical unit.

4. The encoding control method as claimed in claim 1, wherein the first encoding operation comprises:

performing cross-page encoding on at least two data units of the first data units, so that a single parity unit of the at least one first parity unit is suitable for protecting data belonging to a plurality of physical pages in the first data units.

5. The encoding control method as claimed in claim 4, wherein each of the at least one first parity unit belongs to a first type parity unit, and the first encoding operation further comprises:

performing single-page encoding on a single data unit of the first data units to generate a second type parity unit, wherein the second type parity unit is suitable for protecting data belonging to a single physical page in the first data units.

6. The encoding control method as claimed in claim 1, further comprising:

in a state in which the first physical unit serves as an open unit, reading at least one third parity unit from the host system by at least one third host to device access operation, wherein the at least one third parity unit comprises a parity unit belonging to the at least one first parity unit or the at least one second parity unit; and
decoding data read from the first physical unit by the encoding circuit according to the at least one third parity unit.

7. The encoding control method as claimed in claim 1, further comprising:

in a state in which the first physical unit does not serve as an open unit, reading at least one fourth parity unit from the host system by at least one fourth host to device access operation, wherein the at least one fourth parity unit comprises a parity unit belonging to the at least one first parity unit or the at least one second parity unit;
generating at least one fifth parity unit by the encoding circuit according to the at least one fourth parity unit; and
storing the at least one fifth parity unit to a second physical unit of the physical units.

8. The encoding control method as claimed in claim 7, further comprising:

in the state in which the first physical unit does not serve as the open unit, decoding data read from the first physical unit by the encoding circuit according to the at least one fifth parity unit.

9. The encoding control method as claimed in claim 1, further comprising:

receiving a request from the host system, wherein the request is adapted to inquire whether the memory storage device is compatible with host memory buffering;
providing a response to the host system according to the request; and
enabling a host memory buffer by the host system to be accessed by the memory storage device according to the response.

10. A memory storage device, comprising:

a connection interface unit, configured to be coupled to a host system;
a rewritable non-volatile memory module, comprising a plurality of physical units; and
a memory control circuit unit, coupled to the connection interface unit and the rewritable non-volatile memory module,
wherein the memory control circuit unit is configured to read a plurality of first data units from the host system by a plurality of first host to device access operations,
the memory control circuit unit is further configured to execute a first encoding operation to generate at least one first parity unit according to the first data units,
the memory control circuit unit is further configured to transmit the at least one first parity unit to the host system by at least one first device to host access operation,
the memory control circuit unit is further configured to read a plurality of second data units from the host system by a plurality of second host to device access operations,
the memory control circuit unit is further configured to execute a second encoding operation to generate at least one second parity unit according to at least one of the at least one first parity unit and the second data units without reading any of the at least one first parity unit from the host system,
the memory control circuit unit is further configured to transmit the at least one second parity unit to the host system by at least one second device to host access operation, and
the memory control circuit unit is further configured to store the first data units and the second data units to a first physical unit of the physical units.

11. The memory storage device as claimed in claim 10, wherein the first host to device access operations, the at least one first device to host access operation, the second host to device access operations, and the at least one second device to host access operation serve to access a host memory buffer of the host system.

12. The memory storage device as claimed in claim 10, wherein the memory control circuit unit is further configured to:

determine the first physical unit as an open unit; and
in a state in which the first physical unit serves as the open unit, store the first data units and the second data units from the host system to the first physical unit.

13. The memory storage device as claimed in claim 10, wherein the first encoding operation comprises:

performing cross-page encoding on at least two data units of the first data units, so that a single parity unit of the at least one first parity unit is suitable for protecting data belonging to a plurality of physical pages in the first data units.

14. The memory storage device as claimed in claim 13, wherein each of the at least one first parity unit belongs to a first type parity unit, and the first encoding operation further comprises:

performing single-page encoding on a single data unit of the first data units to generate a second type parity unit, wherein the second type parity unit is suitable for protecting data belonging to a single physical page in the first data units.

15. The memory storage device as claimed in claim 10, wherein the memory control circuit unit is further configured to:

in a state in which the first physical unit serves as an open unit, read at least one third parity unit from the host system by at least one third host to device access operation, wherein the at least one third parity unit comprises a parity unit belonging to the at least one first parity unit or the at least one second parity unit; and decode data read from the first physical unit according to the at least one third parity unit.

16. The memory storage device as claimed in claim 10, wherein the memory control circuit unit is further configured to:

in a state in which the first physical unit does not serve as an open unit, read at least one fourth parity unit from the host system by at least one fourth host to device access operation, wherein the at least one fourth parity unit comprises a parity unit belonging to the at least one first parity unit or the at least one second parity unit;

generate at least one fifth parity unit according to the at least one fourth parity unit; and store the at least one fifth parity unit to a second physical unit of the physical units.

17. The memory storage device as claimed in claim 16, wherein the memory control circuit unit is further configured to:

in the state in which the first physical unit does not serve as the open unit, decode data read from the first physical unit according to the at least one fifth parity unit.

18. The memory storage device as claimed in claim 10, wherein the memory control circuit unit is further configured to:

receive a request from the host system, wherein the request is adapted to inquire whether the memory storage device is compatible with host memory buffering; and provide a response to the host system according to the request, wherein the host system is configured to enable a host memory buffer to be accessed by the memory storage device according to the response.

19. A memory control circuit unit, configured to control a memory storage device, wherein the memory storage device comprises a rewritable non-volatile memory module, the rewritable non-volatile memory module comprises a plurality of physical units, and the memory control circuit unit comprises:

a host interface, configured to be coupled to a host system;

a memory interface, configured to be coupled to the rewritable non-volatile memory module;

an encoding circuit; and a memory management circuit, coupled to the host interface, the memory interface, and the encoding circuit, wherein the memory management circuit is configured to read a plurality of first data units from the host system by a plurality of first host to device access operations, the encoding circuit is configured to execute a first encoding operation to generate at least one first parity unit according to the first data units;

the memory management circuit is further configured to transmit the at least one first parity unit to the host system by at least one first device to host access operation, the memory management circuit is further configured to read a plurality of second data units from the host system by a plurality of second host to device access operations, the encoding circuit is further configured to execute a second encoding operation to generate at least one second parity unit according to at least one of the at least one first parity unit and the second data units without reading any of the at least one first parity unit from the host system, the memory management circuit is further configured to transmit the at least one second parity unit to the host system by at least one second device to host access operation, and the memory management circuit is further configured to store the first data units and the second data units to a first physical unit of the physical units.

20. The memory control circuit unit as claimed in claim 19, wherein the first host to device access operations, the at least one first device to host access operation, the second host to device access operations, and the at least one second device to host access operation serve to access a host memory buffer of the host system.

21. The memory control circuit unit as claimed in claim 19, wherein the memory management circuit is further configured to:

determine the first physical unit as an open unit; and in a state in which the first physical unit serves as the open unit, store the first data units and the second data units from the host system to the first physical unit.

22. The memory control circuit unit as claimed in claim 19, wherein the first encoding operation comprises:

performing cross-page encoding on at least two data units of the first data units, so that a single parity unit of the at least one first parity unit is suitable for protecting data belonging to a plurality of physical pages in the first data units.

23. The memory control circuit unit as claimed in claim 22, wherein each of the at least one first parity unit belongs to a first type parity unit, and the first encoding operation further comprises:

performing single-page encoding on a single data unit of the first data units to generate a second type parity unit, wherein the second type parity unit is suitable for protecting data belonging to a single physical page in the first data units.

24. The memory control circuit unit as claimed in claim 19, wherein the memory management circuit is further configured to, in a state in which the first physical unit serves as an open unit, read at least one third parity unit from the host system by at least one third host to device access operation, wherein the at least one third parity unit comprises a parity unit belonging to the at least one first parity unit or the at least one second parity unit, and the encoding circuit is further configured to decode data read from the first physical unit according to the at least one third parity unit.

25. The memory control circuit unit as claimed in claim 19, wherein the memory management circuit is further configured to, in a state in which the first physical unit does not serve as an open unit, read at least one fourth parity unit from the host system by at least one fourth host to device access operation, wherein the at least one fourth parity unit comprises a parity unit belonging to the at least one first parity unit or the at least one second parity unit, the encoding circuit is further configured to generate at least one fifth parity unit according to the at least one fourth parity unit, and the memory management circuit is further configured to store the at least one fifth parity unit to a second physical unit of the physical units.

26. The memory control circuit unit as claimed in claim 25, wherein the encoding circuit is further configured to, in the state in which the first physical unit does not serve as the open unit, decode data read from the first physical unit according to the at least one fifth parity unit.

27. The memory control circuit unit as claimed in claim 19, wherein the memory management circuit is further configured to:
  receive a request from the host system, wherein the request is adapted to inquire whether the memory control circuit unit is compatible with host memory buffering; and
  provide a response to the host system according to the request,
  wherein the host system is configured to enable a host memory buffer to be accessed by the memory control circuit unit according to the response.

* * * * *